United States Patent
Ono et al.

(10) Patent No.: US 9,524,129 B2
(45) Date of Patent: Dec. 20, 2016

(54) INFORMATION PROCESSING APPARATUS, INCLUDING DISPLAY OF FACE IMAGE, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Masafumi Ono, Kanagawa (JP); Manabu Hayashi, Kanagawa (JP); Naoya Nobutani, Kanagawa (JP); Yasuhiro Hirano, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/289,339

(22) Filed: May 28, 2014

(65) Prior Publication Data
US 2015/0124277 A1    May 7, 2015

(30) Foreign Application Priority Data
Nov. 1, 2013   (JP) .................................. 2013-228398

(51) Int. Cl.
| G06K 15/00 | (2006.01) |
| G06F 3/12 | (2006.01) |
| G06F 21/32 | (2013.01) |
| G06F 21/60 | (2013.01) |
| G06K 9/00 | (2006.01) |

(52) U.S. Cl.
CPC ............ *G06F 3/1222* (2013.01); *G06F 3/1238* (2013.01); *G06F 3/1273* (2013.01); *G06F 3/1279* (2013.01); *G06F 21/32* (2013.01); *G06F 21/608* (2013.01); *G06K 9/00255* (2013.01); *G06K 9/00295* (2013.01)

(58) Field of Classification Search
CPC .. G06F 3/04883; G06F 3/0482; G06F 3/1238; G06K 9/00228; G06K 9/00255
USPC .............. 358/1.1, 1.9, 1.13, 1.14, 1.15, 402; 382/100, 107, 115, 118
See application file for complete search history.

(56) References Cited

U.S. PATENT DOCUMENTS

| 8,311,200 B2* | 11/2012 | Kang ..................... H04N 7/147 348/14.08 |
| 2006/0056666 A1* | 3/2006 | Mizutani ............ G07C 9/00158 382/118 |

FOREIGN PATENT DOCUMENTS

JP         2011-221847 A      11/2011

* cited by examiner

*Primary Examiner* — Gabriel Garcia
(74) *Attorney, Agent, or Firm* — Sughrue Mion, PLLC

(57) ABSTRACT

An information processing apparatus includes a memory that stores a log of use of the information processing apparatus by a user, and a display that displays the log of the information processing apparatus stored on the memory together with a face image of a face of the user.

12 Claims, 15 Drawing Sheets

FIG. 11

| USER ID | PASSWORD | IMAGE FILE NAME |
|---|---|---|
| aaabbb | aaa1234 | aaabbb.jpg |
| cccddd | ccc3456 | cccddd.jpg |
| eeefff | eee5678 | eeefff.jpg |
| ggghhh | ggg1357 | - |
| | | |

FIG. 12

| TIME AND DATE | USER ID |
|---|---|
| 10/31/2013 13:10 | aaabbb |
| 10/31/2013 14:20 | ggghhh |
| 10/31/2013 13:40 | cccddd |

INFORMATION PROCESSING APPARATUS, INCLUDING DISPLAY OF FACE IMAGE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-228398 filed Nov. 1, 2013.

BACKGROUND

Technical Field

The present invention relates to an information processing apparatus, an information processing method, and a non-transitory computer readable medium.

SUMMARY

According to an aspect of the invention, there is provided an information processing apparatus including a memory that stores a log of use of the information processing apparatus by a user, and a display that displays the log of the information processing apparatus stored on the memory together with a face image of a face of the user.

BRIEF DESCRIPTION OF THE DRAWINGS

Exemplary embodiments of the present invention will be described in detail based on the following figures, wherein:

FIG. 11 illustrates an example of an authentication table;

FIG. 12 illustrates an example of log data;

DETAILED DESCRIPTION

Exemplary embodiments of the present invention are described with reference to the drawings. An information processing apparatus of the exemplary embodiments is applied to an image forming apparatus.

Figure 1:
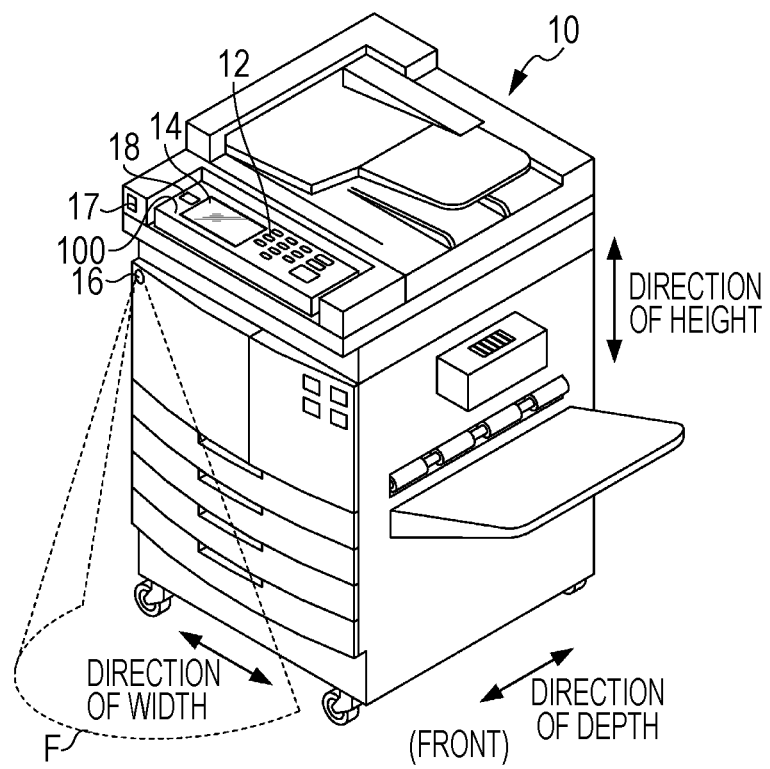
FIG. 1 is a perspective external view illustrating an image forming apparatus of an exemplary embodiment of the present invention.

FIG. 1 is a perspective external view illustrating the image forming apparatus 10 of an exemplary embodiment of the present invention. As illustrated in FIG. 1, the image forming apparatus 10 is of a console type, and performs information processing including a scan process, a copy process, and a facsimile transmission process. A person who uses the image forming apparatus 10 (namely, a user) may stand in front of the image forming apparatus 10 and operates an operation panel 100. The operation panel 100 is arranged on a top front position of the image forming apparatus 10. The operation panel 100 includes an operation unit 12, a display 14, and a second imaging unit 18. In order to sense the presence of a person present in front of the image forming apparatus 10, the image forming apparatus 10 further includes a pyroelectric sensor 16 and a first imaging unit 17. A sensing area F of FIG. 1 is an area where the pyroelectric sensor 16 may sense the presence of a person. The first imaging unit 17 is arranged higher than the pyroelectric sensor 16 in the direction of height of the image forming apparatus 10.

The image forming apparatus 10 operates in one of a standard mode and a sleep mode, different from each other in terms of power consumption. The standard mode is one example of a "first mode" in which the image forming apparatus 10 performs the information processing in response to an operation performed by the user. In the standard mode, each element of the image forming apparatus 10 is supplied with power to be used to execute the information processing. The sleep mode is an example of a "second mode" in which at least part of the operation of the image forming apparatus 10 is temporarily suspended. In the sleep mode, power supplying to at least part of the image forming apparatus 10 is suspended. The image forming apparatus 10 consumes power less than in the standard mode. When the image forming apparatus 10 operates in the sleep mode, the controller 11, the pyroelectric sensor 16, and the first imaging unit 17 are supplied with power so that each of these units remains operative in the sleep mode.

Figure 2:
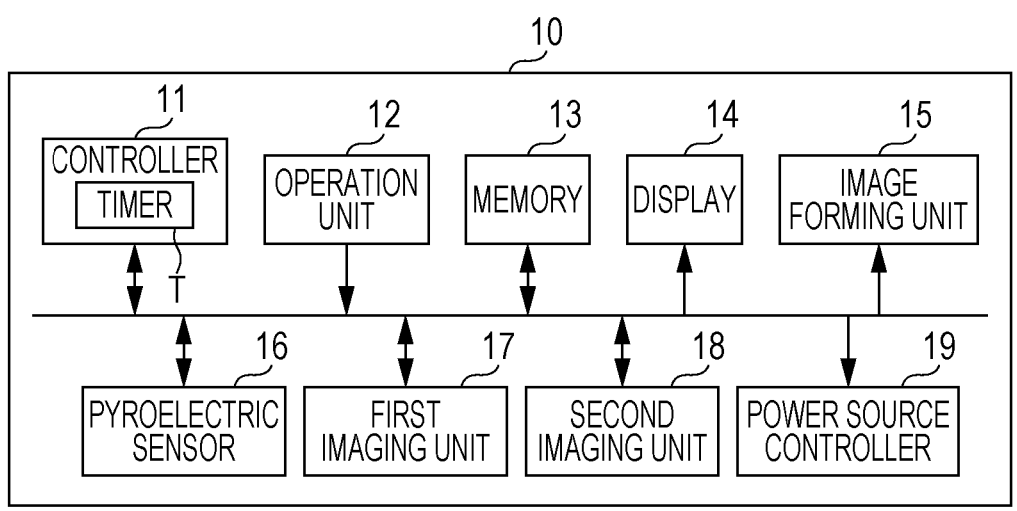
FIG. 2 is a block diagram illustrating the hardware configuration of the image forming apparatus.

FIG. 2 is a block diagram illustrating the hardware configuration of the image forming apparatus 10. As illustrated in FIG. 2, the image forming apparatus 10 includes controller 11, operation unit 12, memory 13, display 14, image forming unit 15, pyroelectric sensor 16, first imaging unit 17, second imaging unit 18, and power source controller 19.

The controller 11 includes a processor that includes a central processing unit (CPU), a read-only memory (ROM), and a random-access memory (RAM). The CPU controls each of the units of the image forming apparatus 10 by reading a program stored on the ROM or the memory 13 onto the RAM, and executing the program. The controller 11 further includes an image processing unit such as an application specific integrated circuit (ASIC). The image processing unit controls the image processing including image analysis on the image forming apparatus 10. The controller 11 further includes a timer T as a time measuring unit to measure time.

The operation unit 12 includes multiple controls. The operation unit 12 receives an operation performed by the user, and then supplies an operation signal responsive to the received operation to the controller 11. The memory 13 includes a hard disk device, for example, and stores a control program to be executed by the controller 11. The display 14 includes a liquid-crystal display, for example, and is arranged next to the operation unit 12 in the direction of width of the image forming apparatus 10. The display 14 is a display device that displays an image (screen) thereon. The image forming unit 15 is a printer that forms an image on a sheet through an electrophotographic process, for example.

The pyroelectric sensor 16 includes a pyroelectric element that senses a quantity of infrared light within the sensing area F, and supplies the sensing result of the quantity of infrared light to the controller 11. Each of the first imaging unit 17 and the second imaging unit 18 includes an imaging lens and an imaging element, such as a charge-coupled device (CCD), and captures an image (moving image here). The first imaging unit 17 has a particularly wide-angle lens (such as a fish-eye lens), and images the front area in front of the image forming apparatus 10 at an angle wider than a standard imaging lens. The second imaging unit 18 is arranged to be next to the display 14 in the direction of width of the image forming apparatus 10. The second imaging unit 18 is located at a position that allows the face of a user to be imaged. This is intended to allow the second imaging unit 18 to authenticate the face of the user using the captured image.

The power source controller 19 is electrically connected to a power source, such as a commercial power source (not illustrated here), and controls power supplying from the power source to each unit of the image forming apparatus 10. For example, when the controller 11 sets the image forming apparatus 10 to the standard mode or the sleep mode, the power source controller 19 controls the power supplying to each unit of the image forming apparatus 10 in accordance with the set mode.

A power source line connected to each unit of the image forming apparatus 10 is not illustrated in FIG. 2.

The image forming apparatus 10 also includes, besides the units described above, units of an ordinary image forming apparatus, such as an image reading unit to read the image of a document or the like, and a communication unit to communicate with an external device. The image forming apparatus 10 further includes a unit to perform information processing in conjunction with the peripheral device 20, for example, a connection unit to be connected to the peripheral device 20 (such as a post-processing device) to be described below. The peripheral device 20 is not particularly limited to any specific structure. The peripheral device 20 in one example is a large-capacity sheet container device that stores sheets to be supplied to the image forming apparatus 10 or sheets discharged from the image forming apparatus 10.

An example of the information processing of the image forming apparatus 10 is described below. When the copy process is performed, the controller 11 generates image data by causing the image reading unit to read the image of the document, and causes the image forming unit 15 to form the image on a sheet in accordance with the image data. When the scan process is performed, the controller 11 generates image data by causing the image reading unit to read the image of a document, and stores the image data on the memory 13 or transmits the image data via a network. When the facsimile transmission process is performed, the controller 11 generates image data by causing the image reading unit to read the image of a document, and transmits the image data in a facsimile transmission via a telephone line (not illustrated).

Figure 3:
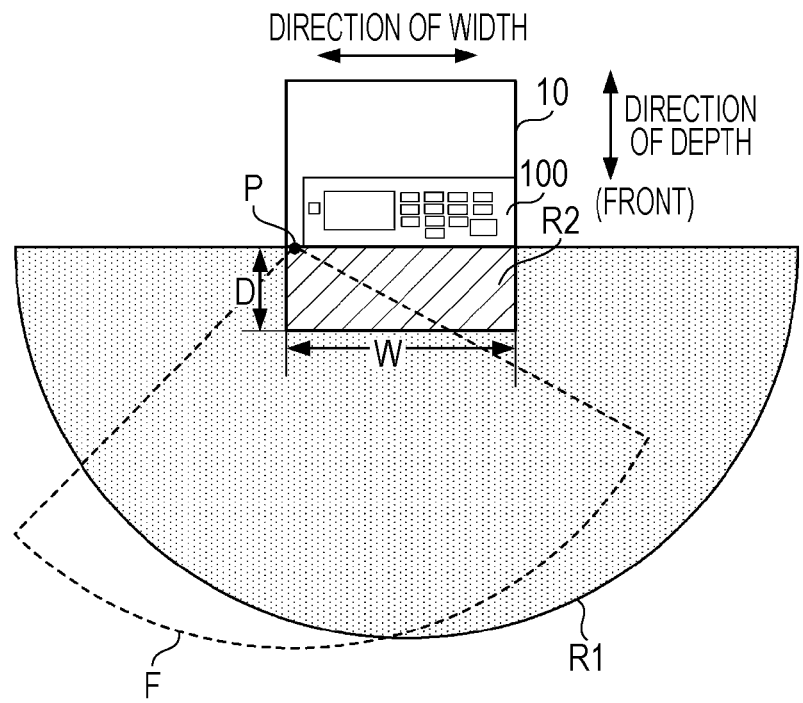
FIG. 3 illustrates an area where the presence of a person is sensed by the image forming apparatus.

FIG. 3 illustrates an area where the presence of a person is detected by the image forming apparatus 10. FIG. 3 is a plan view of the image forming apparatus 10 and the surrounding area thereof that are viewed from above the image forming apparatus 10 in the direction of height of the image forming apparatus 10.

As illustrated in FIG. 3, the sensing area F of the pyroelectric sensor 16 is formed in front of the image forming apparatus 10 and has a generally sector shape in a plan view if viewed from above in the direction of height. If a person who is going to use the image forming apparatus 10 approaches the image forming apparatus 10, the person first enters the sensing area F.

An approach sensing area R1 of FIG. 3 is formed in front of the image forming apparatus 10 and has a generally sector shape in a plan view if viewed from above in the direction of height. The approach sensing area R1 is set up to generally include the sensing area F. The person who approaches the image forming apparatus 10 enters the approach sensing area R1. The approach sensing area R1 is an example of an area of a "first distance" from the image forming apparatus 10. A location labeled "P" in FIG. 3 where the first imaging unit 17 is arranged is referred to as the location of the image forming apparatus 10.

The approach sensing area R1 is a sector having a central angle of 180 degrees (semi-circle), but the central angle may be an angle other than 180 degrees. However, the first imaging unit 17 is set up so that the first imaging unit 17 has at least the entire approach sensing area R1 as an imaging area.

A presence sensing area R2 is set up in front of the image forming apparatus 10 and has a rectangular shape in a plan view if viewed from above in the direction of height. The rectangular area has a length W in the direction of width of the image forming apparatus 10 and a length D in the direction of depth of the image forming apparatus 10. The length W in the direction of width of the presence sensing area R2 is approximately equal to the length of the image forming apparatus 10 in the direction of width thereof. The presence sensing area R2 is an example of an area of a "second distance" from the image forming apparatus 10, and is closer to the image forming apparatus 10 than the approach sensing area R1. For this reason, the entire presence sensing area R2 is set up to be enclosed in the approach sensing area R1. The user of the image forming apparatus 10 enters the presence sensing area R2, and then stays within the presence sensing area R2 to perform an operation using the operation panel 100.

The controller 11 senses a person within each of the approach sensing area R1 and the presence sensing area R2 by analyzing the image captured by the first imaging unit 17. There is more detail on this below. The approach sensing area R1 and the presence sensing area R2 are not necessarily set up at a precision level exactly as illustrated FIG. 3, and it is sufficient enough if the approach sensing area R1 and the presence sensing area R2 are set up at a precision level as high as the level estimated from the captured image of the first imaging unit 17.

Figure 4:
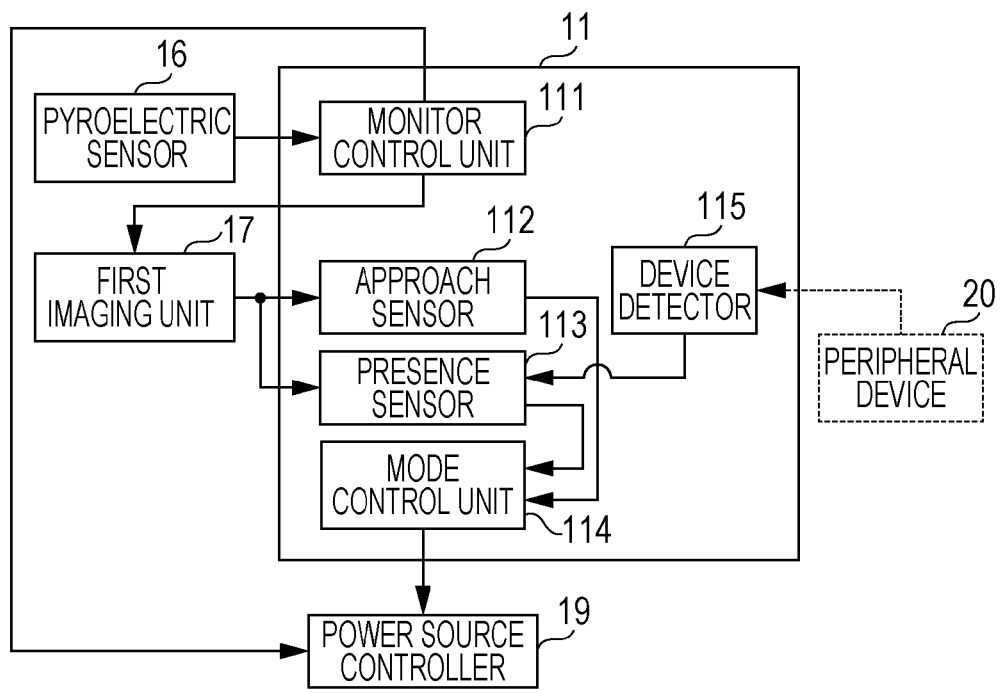
FIG. 4 is a functional block diagram illustrating the image forming apparatus.

FIG. 4 is a functional block diagram illustrating the controller 11 in the image forming apparatus 10. As illustrated in FIG. 4, the controller 11 performs functions corresponding to monitor control unit 111, approach sensor 112, presence sensor 113, mode control unit 114, and device detector 115.

The monitor control unit 111 controls the first imaging unit 17 by monitoring a quantity of infrared light from the pyroelectric sensor 16 while the image forming apparatus 10 operates in the sleep mode. More specifically, upon sensing the presence of a person within the sensing area F in response to the sensing result of the infrared light of the pyroelectric sensor 16, the monitor control unit 111 starts up the first imaging unit 17 to start imaging. In this case, the monitor control unit 111 instructs the power source controller 19 to supply power to the first imaging unit 17.

The approach sensor 112 senses the approach of a person within the approach sensing area R1. The approach sensor 112 obtains the captured image of the approach sensing area R1 from the first imaging unit 17, and senses the approach of the person to the image forming apparatus 10 in accordance with the captured image. For example, the approach sensor 112 analyzes the captured image, and senses the distance from the image forming apparatus 10 to the person and the movement of the person. The approach sensor 112 thus senses the approach of the person within the approach sensing area R1. The approach sensor 112 is an example of a "first sensor unit".

The presence sensor 113 senses the presence of a person within the presence sensing area R2. The presence sensor 113 obtains the captured image of the approach sensing area R1 from the first imaging unit 17, and senses the presence of the person within the presence sensing area R2 in accordance with the captured image. For example, the presence sensor 113 analyzes the captured image, and senses the distance from the image forming apparatus 10 to the person and the location of the person. The presence sensor 113 thus senses the presence of the person within the presence sensing area R2. The presence sensor 113 is an example of a "second sensor unit", or a "sensor unit" that senses the presence of the person within the second distance closer to the image forming apparatus 10 than the first distance in accordance with the image captured at the first distance from the image forming apparatus 10.

The mode control unit 114 controls the mode in which the image forming apparatus 10 operates. When another mode is set in the image forming apparatus 10, the mode control unit 114 instructs the power source controller 19 to supply power in response to the set mode and performs a control operation to start up or suspend operations of each unit of the image forming apparatus 10. For example, if the approach sensor 112 has sensed the approach of a person with the image forming apparatus 10 in the sleep mode, the mode control unit 114 shifts the image forming apparatus 10 from the sleep mode to the standard mode. When the presence sensor 113 senses the presence of the person, the mode control unit 114 sets the image forming apparatus 10 to be in the standard mode. When the presence sensor 113 no longer senses the presence of the person, the mode control unit 114 shifts the image forming apparatus 10 to the sleep mode. The mode control unit 114 is an example of a "shifting unit".

The mode control unit 114 may set the image forming apparatus 10 to the mode in response to another trigger. For example, upon receiving an operation to shift to the sleep mode from the operation unit 12, the mode control unit 114 shifts the image forming apparatus 10 to the sleep mode.

The device detector 115 detects the connection of the peripheral device 20 to the image forming apparatus 10. When the device detector 115 has detected the connection of the peripheral device 20, the presence sensor 113 varies the presence sensing area R2 in response to the peripheral device 20, the connection of which has been detected. The approach sensing area R1 remains unchanged regardless of the detection results by the device detector 115. The peripheral device 20 may be a device arranged external to the image forming apparatus 10. The device detector 115 is an example of a "detector unit".

As described above, the controller 11 functions as a power control device that controls power to the image forming apparatus 10. The image forming apparatus 10 may include a human detector mounted on a module. The pyroelectric sensor 16, the first imaging unit 17 and the second imaging unit 18 are mounted on the module that implements the functions of the monitor control unit 111, the approach sensor 112, the presence sensor 113, and the device detector 115. In such a case, the controller 11 controls the human detector, and performs a control process responsive to sensing results of the human detector as to the approach and the presence of a person.

Figure 5:
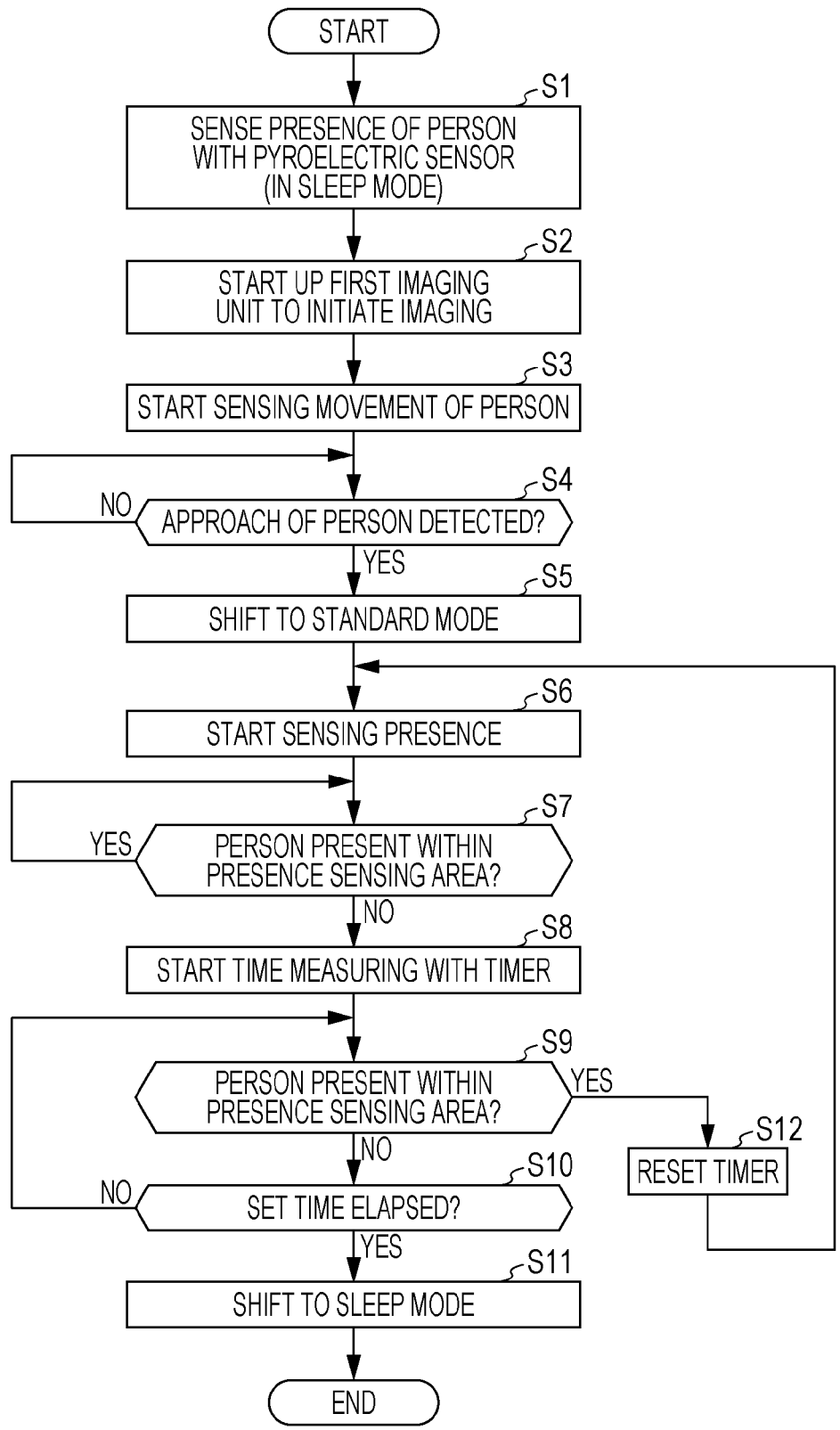
FIG. 5 is a flowchart illustrating a process to control the mode of the image forming apparatus.

FIG. 5 is a flowchart illustrating a process to control the mode of the image forming apparatus 10. FIG. 6 and FIG. 7 illustrate examples of the change of the location of a person with time nearby the image forming apparatus 10. As FIG. 3, FIG. 6 and FIG. 7 and, as described below, FIG. 9 and FIG. 10 illustrate plan views of the image forming apparatus 10 and the surround area thereof viewed from above the image forming apparatus 10 in the direction of height of the image forming apparatus 10. The operation of the image forming apparatus 10 is described below with the presence sensing area R2 set up as illustrated in FIG. 3, in other words, with the peripheral device 20 not connected to the image forming apparatus 10.

Figure 6A:
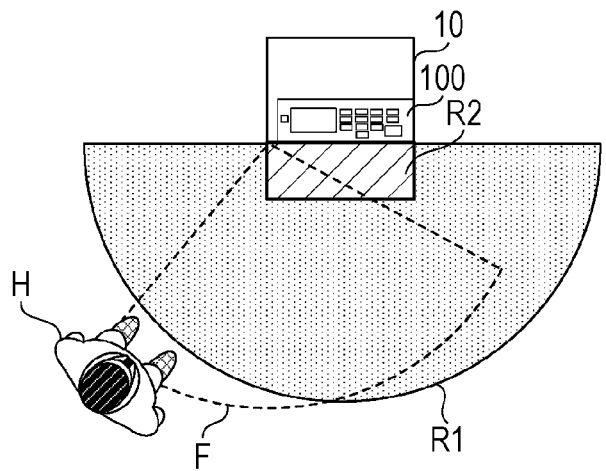
FIGS. 6A through 6C illustrate an example of the change of the location of a person nearby the image forming apparatus with time.

With the image forming apparatus 10 operating in the sleep mode, the controller 11 monitors the sensing results of the quantity of infrared light with the pyroelectric sensor 16, and determines whether a person is present within the sensing area F. When a person H enters the sensing area F as illustrated in FIG. 6A, the controller 11 senses the presence of the person within the sensing area R in response to the sensing results of the pyroelectric sensor 16 (step S1).

If the presence of the person is sensed within the sensing area F, the controller 11 instructs the power source controller 19 to start the power supplying to the first imaging unit 17 and causes the first imaging unit 17 to begin imaging the approach sensing area R1 (step S2). When the first imaging unit 17 starts imaging, the controller 11 analyzes the image obtained from the first imaging unit 17, and then starts sensing the movement of the person by analyzing the image obtained from the first imaging unit 17 (step S3).

In the operation of sensing the movement of the person in step S3, the controller 11 estimates the distance from the image forming apparatus 10 to the person while calculating a motion vector indicating the movement of the person. The operation of sensing the movement of the person may be a related art technique. For example, the controller 11 estimates the distance from the image forming apparatus 10 to the person based on the magnitude of a part of the body of the person detected from the captured image. The controller 11 also compares sequentially multiple frames of the captured images by performing a framing operation on the captured images from the first imaging unit 17. In this case, the controller 11 senses the toe as the part of the body of the person, and calculates the motion vector by analyzing the movement of the sensed part. For example, the controller 11 corrects the captured image from the first imaging unit 17 (into a plan view form), and then senses the movement of the person.

Figure 6B:
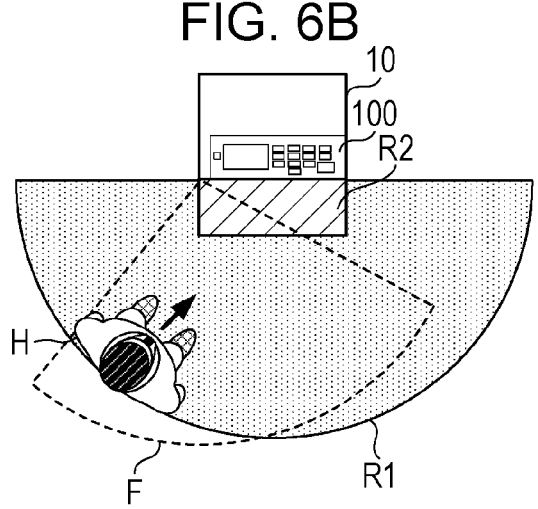

The controller 11 determines whether the approach of the person is detected within the approach sensing area R1 (step S4). As illustrated in FIG. 6B, the controller 11 may determine that the person H is within the approach sensing area R1, and that the person H moves toward the image forming apparatus 10 (as denoted by an arrow in FIG. 6B). The controller 11 then determines that the approach of the person has been sensed (yes branch from step S4).

Note that during the period throughout which the pyroelectric sensor 16 senses the presence of the person, the controller 11 performs the operation to sense the movement of the person, and repeats the operation in step S4 to determine whether the person approaches (no branch from step S4).

In the yes branch from step S4, the controller 11 shifts the image forming apparatus 10 from the sleep mode to the standard mode (step S5). The controller 11 instructs the power source controller 19 to perform the power supplying to each unit of the image forming apparatus 10 in response to the standard mode and starts up each unit of the image forming apparatus 10.

The controller 11 does not shift the image forming apparatus 10 to the standard mode immediately when the presence of a person has been sensed within the approach sensing area R1 but shifts the image forming apparatus 10 to the standard mode when the approach of the person to the image forming apparatus 10 has been sensed. This reduces the possibility that the image forming apparatus 10 is shifted to the standard mode only when the person H simply passes through the approach sensing area R1.

The controller 11 starts an operation to sense the presence (standstill) of the person within the presence sensing area R2 (step S6). The controller 11 senses a part of the body of the person by analyzing the captured image from the first imaging unit 17, and senses the presence of the person within the presence sensing area R2 in accordance with the location and the size of the sensed part. For example, the controller 11 estimates the distance from the image forming apparatus 10 to the person in response to the size of the detected part of the body, and identifies a direction to the location of the person based on the location of the sensed part of the body.

Figure 6C:
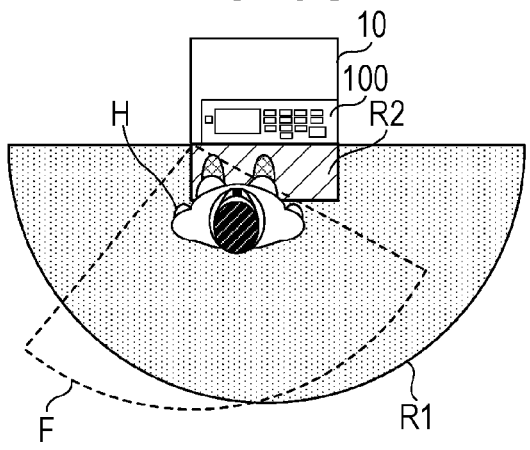

The controller 11 determines whether the person is present within the presence sensing area R2 (step S7). If the controller 11 determines with the person H at the location as illustrated in FIG. 6C that the person is present within the presence sensing area R2 (yes from step S7), processing returns to step S6. The controller 11 repeats the operation to sense the presence of the person within the presence sensing area R2 with the image forming apparatus 10 set in the standard mode until the presence of the person is no longer sensed within the presence sensing area R2.

Figure 7A:
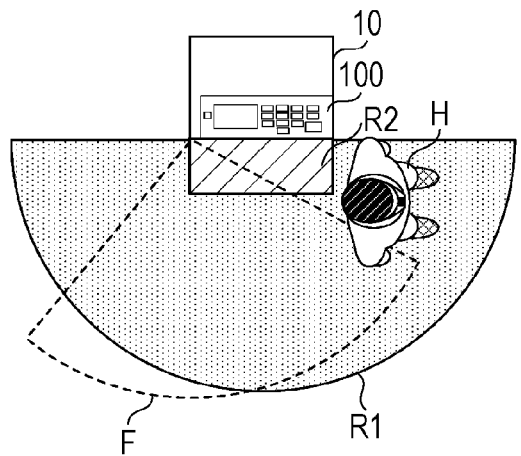
FIGS. 7A through 7C illustrate an example of the change of the location of the person nearby the image forming apparatus with time.

As illustrated in FIG. 7A, the person H may move out of the presence sensing area R2 possibly because of the completion of the job with the image forming apparatus 10. In such a case, the controller 11 determines that the person is no longer present within the presence sensing area R2 (no branch from step S7), and proceeds to step 8. The controller 11 starts to measure time (step S8). In other words, using the timer T, the controller 11 measures elapsed time from when the person is no longer present within the presence sensing area R2.

Figure 7B:
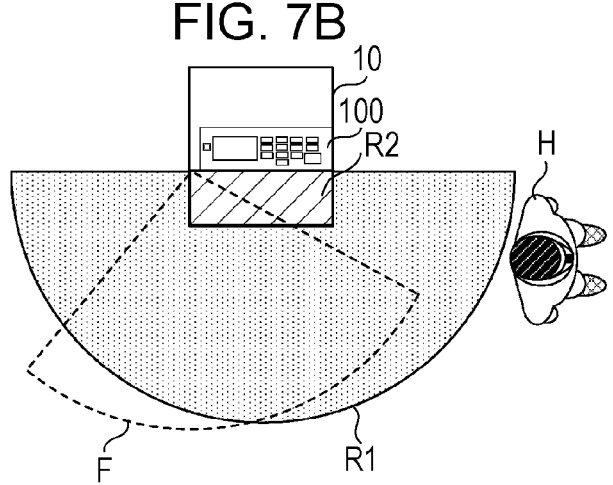

The controller 11 determines whether a person is present with the presence sensing area R2 (step S9). In the operation of step S9, the controller 11 determines whether the presence of the person is detected again once the person has been no longer present within the presence sensing area R2. As illustrated in FIG. 7B, the person H may gradually go away from the image forming apparatus 10 and no person may be present within the presence sensing area R2. The controller 11 then determines that the answer to the operation in step S9 is "no", and proceeds to step S10.

The controller 11 determines whether the time set in the timer T has elapsed (step S10). The set time may be 1 minute, for example. Time different from 1 minute may also be set. If the controller 11 determines that the set time has not elapsed (no branch from step S10), processing returns to step S9. More specifically, the controller 11 determines in each of the steps S9 and S10 whether the period throughout which no person is present within the presence sensing area R2 is equal to the set time.

Upon determining in step S10 that the set time of the timer T has elapsed since the start of the time measurement of the timer T (yes branch from step S10), the controller 11 shifts the image forming apparatus 10 from the standard mode to the sleep mode (step S11). In this operation, the controller 11 instructs the power source controller 19 to supply power for the sleep mode to each unit of the image forming apparatus 10 and suspends the operation of each unit in the image forming apparatus 10 that is to be suspended during the sleep mode. When the presence of the person is no longer sensed within the sensing area F, the controller 11 suspends the operation of the first imaging unit 17.

Figure 7C:
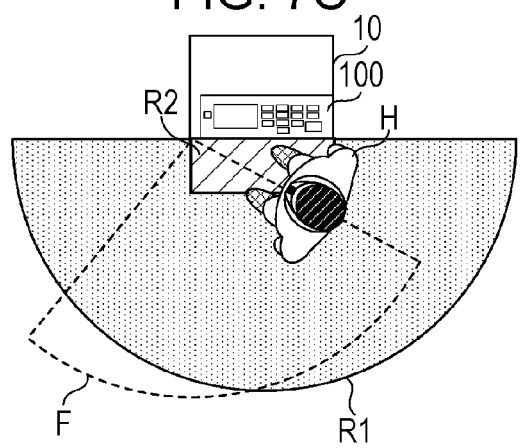

As illustrated in FIG. 7C, the controller 11 may sense the presence of a person again before the elapse of the set time from when the person is no longer present within the presence sensing area R2 after the start of the time measurement of the timer T. In such a case, the controller 11 determines that the answer to the operation in step S9 is "yes", and processing proceeds to step S12. The controller 11 stops the time measurement of the timer and resets the timer T (step S12). The controller 11 stops shifting to the sleep mode initiated by the no-presence of the person within the presence sensing area R2, and then returns to step S6. In other words, the controller 11 again executes the operation that applies to the case when the person is present within the presence sensing area R2.

It is assumed herein that the same person, i.e., the person H has returned back. If a different person comes into the presence sensing area R2, the controller 11 also determines that the answer to step S9 is "yes".

The general flow of the process illustrated in FIG. 5 has been described. An operation of setting the presence sensing area R2 in response to the peripheral device 20 is described below. If the peripheral device 20 is connected to the image forming apparatus 10, the controller 11 varies the presence sensing area R2 in response to the connected peripheral device 20 in step S6.

Figure 8:
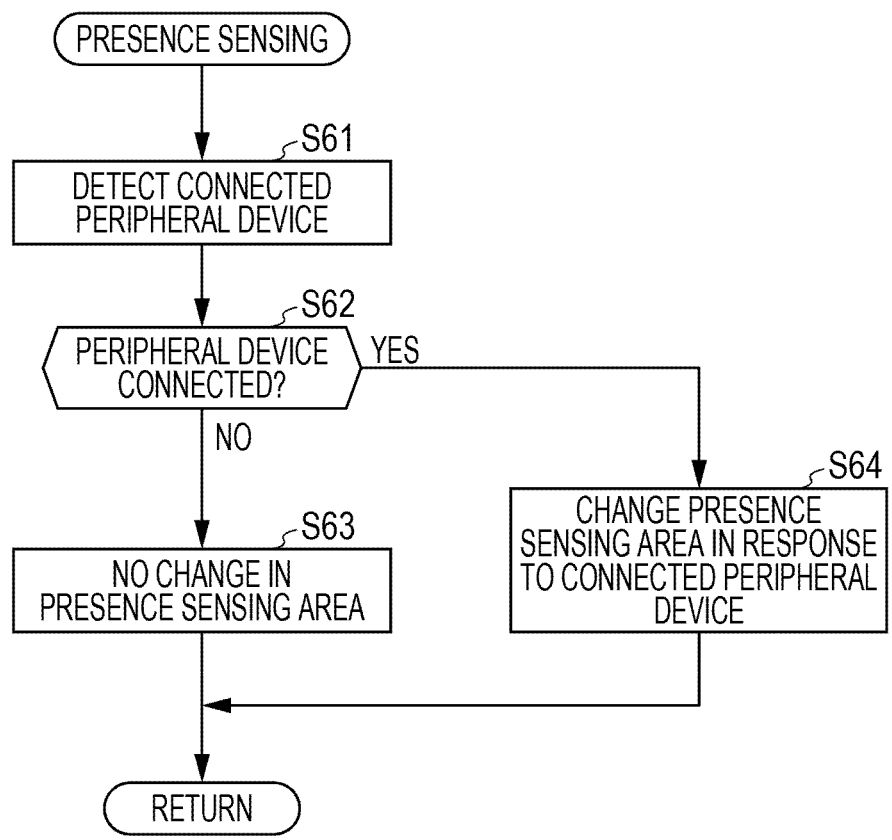
FIG. 8 is a flowchart illustrating a process of setting a presence sensing area of the image forming apparatus.

FIG. 8 is a flowchart illustrating a process of setting the presence sensing area R2 of the image forming apparatus 10. Each of the operations of FIG. 8 is executed prior to the start of the operation to sense the presence of the person within the presence sensing area R2. FIG. 9 and FIG. 10 illustrate setting examples of the presence sensing area R2.

The controller 11 detects the connection of the peripheral device 20 (step S61). More specifically, the controller 11 detects whether the peripheral device 20 is connected. If the peripheral device 20 is connected, the controller 11 detects the type of the peripheral device 20.

The controller 11 automatically detects whether the peripheral device 20 is connected or not and detects the type of the peripheral device 20 if the peripheral device 20 is connected. Optionally, the controller 11 may detect whether the peripheral device 20 is connected or not based on information manually set by the user.

The controller 11 determines whether the peripheral device 20 is connected (step S62). Upon determining that the peripheral device 20 is not connected (no branch from step S62), the controller 11 does not vary the presence sensing area R2 (step S63). More specifically, the controller 11 sets up the presence sensing area R2 having a length of W in the direction of width and a length of D in the direction of depth of the image forming apparatus 10 in a plan view viewed from above the image forming apparatus 10 in the direction of height of the image forming apparatus 10 (see FIG. 3).

On the other hand, upon determining that the peripheral device 20 is connected (yes branch from S62), the controller 11 varies the presence sensing area R2 responsive to the type of the connected peripheral device 20 (step S64). The type of the peripheral device 20 is identified by a model number of the peripheral device 20. The type of the peripheral device 20 may also be identified by any other identification thereof. The relationship between the type of the peripheral device 20 and the presence sensing area R2 is listed in a management table (not illustrated) to be stored on the memory 13. Referring to the management table, the controller 11 sets up the presence sensing area R2.

In the operation of step S64, the controller 11 varies the presence sensing area R2 in accordance with the location and the dimensions of the peripheral device 20.

Figure 9A:
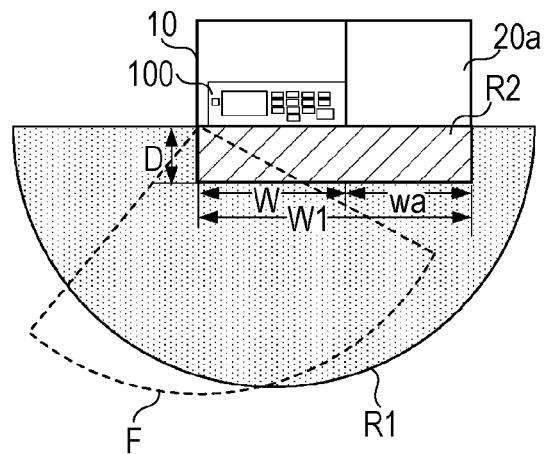
FIGS. 9A through 9C illustrate a setting example of the presence sensing area of the image forming apparatus.

As illustrated in FIG. 9A, a peripheral device 20a may now be mounted next to the right side (if viewed from the user) of the image forming apparatus 10 in the direction of width of the image forming apparatus 10, and the length of the peripheral device 20a in the direction of width may be wa. In such a case, in order to set up the presence sensing area R2 in front of all the front sides of the image forming apparatus 10 and the peripheral device 20a, the controller 11 sets the sum W1 (=W+wa) of the length W of the image forming apparatus 10 in the direction of width thereof and the length wa of the peripheral device 20a in the direction of width thereof to be the length in the direction of width of the presence sensing area R2. The controller 11 sets the length in the direction of depth to be D in the same manner as in FIG. 3.

Figure 9B:
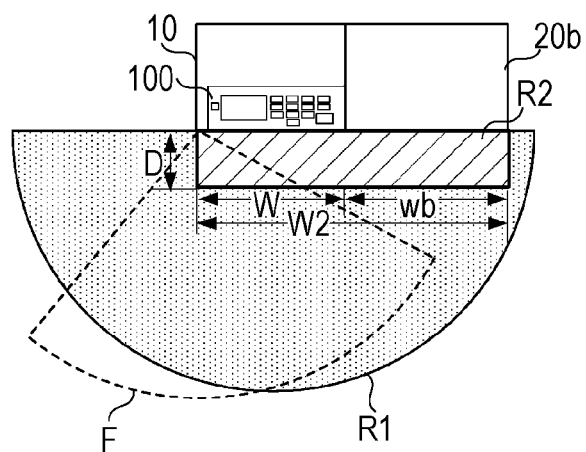

As illustrated in FIG. 9B, a peripheral device 20b may now be mounted next to the right side of the image forming apparatus 10 in the direction of width of the image forming apparatus 10, and the length of the peripheral device 20b in the direction of width may be wb (wb>wa). In such a case, in order to set up the presence sensing area R2 in front of all the front sides of the image forming apparatus 10 and the peripheral device 20b, the controller 11 sets the sum W2 (=W+wb) of the length W of the image forming apparatus 10 in the direction of width thereof and the length wb of the peripheral device 20b in the direction of width thereof to be the length in the direction of width of the presence sensing area R2. The controller 11 sets the length in the direction of depth to be D in the same manner as in FIG. 3.

Figure 9C:
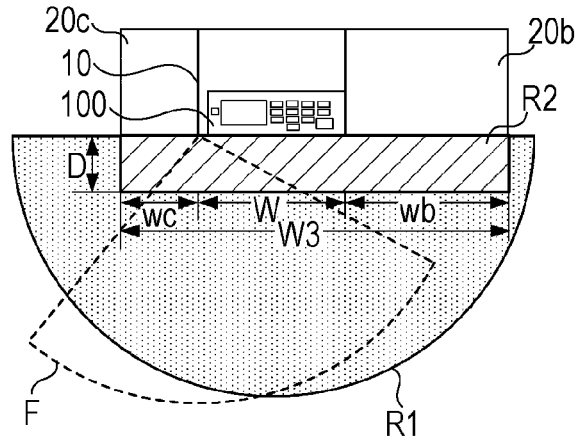

As illustrated in FIG. 9C, in addition to the peripheral device 20b, a peripheral device 20c may now be mounted next to the left side (if viewed from the user) of the image forming apparatus 10 in the direction of width of the image forming apparatus 10, and the length of the peripheral device 20c in the direction of width may be wc. In such a case, in order to set up the presence sensing area R2 in front of all the front sides of the image forming apparatus 10 and the peripheral devices 20b and 20c, the controller 11 sets the sum W3 (=W+wb+wc) of the length W of the image forming apparatus 10 in the direction of width thereof, the length wb of the peripheral device 20b in the direction of width thereof and the length wc of the peripheral device 20c in the direction of width thereof to be the length in the direction of width of the presence sensing area R2. The controller 11 sets the length in the direction of depth to be D in the same manner as in FIG. 3.

If the peripheral device 20 is arranged next to the image forming apparatus 10 in the direction of width of the image forming apparatus 10, the user of the image forming apparatus 10 may work not only in front of the image forming apparatus 10 but also in front of the peripheral device 20. In such a case, if the presence sensing area R2 is set up only in front of the image forming apparatus 10 as illustrated in FIG. 3, the image forming apparatus 10 may be shifted to the sleep mode while the user is still working. If the presence sensing area R2 is varied in response to the connected peripheral device 20, the controller 11 senses the user working in front of the peripheral device 20 staying within the presence sensing area R2. In other words, the presence sensing area R2 is smaller when the peripheral device 20 is not connected than when the peripheral device 20 is connected.

Figure 10A:
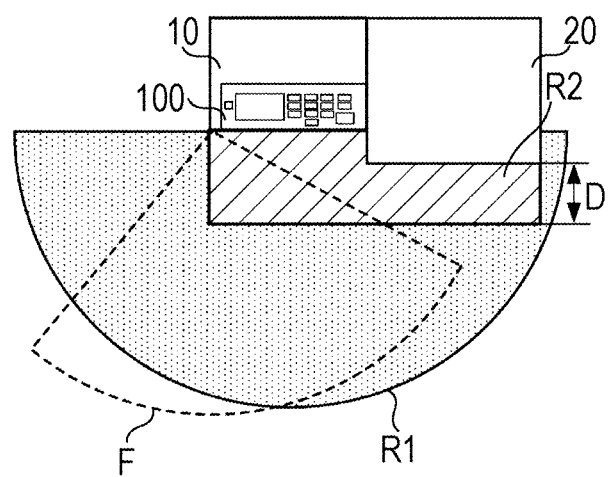
FIGS. 10A and 10B illustrate the setting example of the presence sensing area of the image forming apparatus.

In the example of FIG. 9, the controller 11 sets the entire length of the presence sensing area R2 in the direction of depth to be D. As illustrated in FIG. 10A, the position of the front side of the image forming apparatus 10 and the position of the front side of the peripheral device 20 may be different in the direction of depth. In such a case, the controller 11 may set the presence sensing area R2 so that the distance D is reserved from one of the front sides whichever is closer to the user. If the front side of the image forming apparatus 10 is closer to the user, the controller 11 sets at least the distance D to be reserved from the front side of the image forming apparatus 10.

If the first imaging unit 17 in the image forming apparatus 10 has as the sensing area thereof not only the front side of the image forming apparatus 10 and the front side of the peripheral device 20 but also the lateral side of the image forming apparatus 10, the controller 11 may set the presence sensing area R2 on the lateral side of the image forming apparatus 10.

Figure 10B:
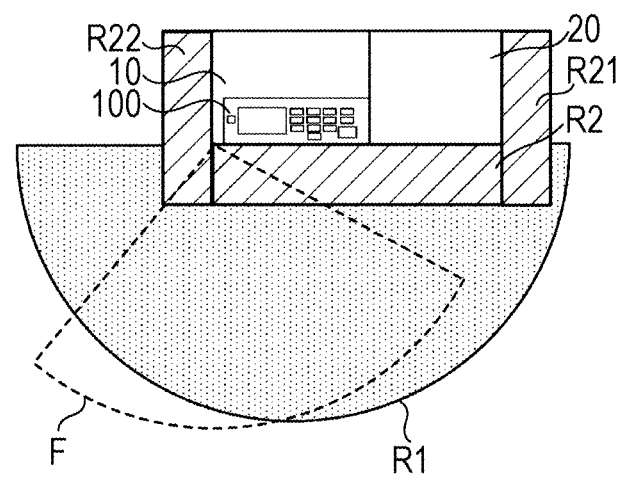

As illustrated in FIG. 10B, the controller 11 may set a presence sensing area R22 on the lateral side of the image forming apparatus 10 opposite the peripheral device 20. The controller 11 may also set a presence sensing area R21 on the lateral side of the peripheral device 20 opposite the image forming apparatus 10. With this arrangement, an unwanted shifting of the image forming apparatus 10 to the sleep mode is controlled when the user works on the lateral side of the image forming apparatus 10 or on the lateral side of the peripheral device 20.

When the peripheral device 20 is not connected, the controller 11 may also set the presence sensing area on the lateral sides of the image forming apparatus 10. The controller 11 may set the presence sensing area R2 to be longer or shorter in the direction of width instead of setting the presence sensing area R2 to be approximately equal to the length of the image forming apparatus 10 in the direction of width and the length of the peripheral device 20 in the direction of width.

As described above, the image forming apparatus 10 shifts from the sleep mode to the standard mode upon sensing the approach of a person within the approach sensing area R1. If the person is later no longer present within the presence sensing area R2 closer to the image forming apparatus 10 than the approach sensing area R1, the image forming apparatus 10 shifts from the standard mode to the sleep mode. The image forming apparatus 10 shifts to the sleep mode more quickly than in the operation in which the image forming apparatus 10 shifts when the person is no longer present from within the approach sensing area R1. If described in terms of imaging by the first imaging unit 17, the image forming apparatus 10 senses the non-presence of the person from within the presence sensing area R2 by estimating the distance to the person from the captured image from the first imaging unit 17. The image forming apparatus 10 shifts to the sleep mode more quickly than in the operation in which the image forming apparatus 10 shifts to the sleep mode when the presence of the person is no longer sensed from the captured image. The image forming apparatus 10 thus performs power saving control by setting the mode in response to the distance therefrom to the person.

Since the image forming apparatus 10 estimates the distance from the image forming apparatus 10 to the person by analyzing the captured image, the image forming apparatus 10 has a simplified structure with an increase in the number of sensors controlled in comparison with the case in which another type of sensor such as a reflective-type distance sensor is used.

An authentication process to be performed by the image forming apparatus 10 is described below. Also, a user display process of the image forming apparatus 10 is described below. A person predetermined by the administrator who manages the image forming apparatus 10 is authorized to use the image forming apparatus 10. The image forming apparatus 10 performs a face authentication process or an authentication process by a user identification (ID) and a password. The memory 13 stores an authentication table TB1 that lists information to authenticate a user who is authorized to use the image forming apparatus 10.

FIG. 11 illustrates an example of the authentication table TB1. The authentication table TB1 includes a record on each person who is authorized to use the image forming apparatus 10. A "user ID" field stores an identifier that is granted to a user who is authorized to use the image forming apparatus 10. A "password" field stores a password that is used to verify that the user is authorized to use the image forming apparatus 10. An "image file name" field stores an image file name of a face photograph of a person who is authorized to use the image forming apparatus 10. The memory 13 stores an image file of the face photograph of the person who is authorized to use the image forming apparatus 10. No image file name is stored in the image file name field in a fourth-row record of FIG. 11 for a person who performs an authentication process by the user ID and the password instead of the face authentication.

The memory 13 stores log data including the user ID of the authorized user, and time and date on which the user has been authorized. FIG. 12 illustrates part of the log data stored on the memory 13. A "time and date" field stores time and date on which the user has been authenticated. A "user ID" field stores the user ID of the authenticated user.

Figure 13:
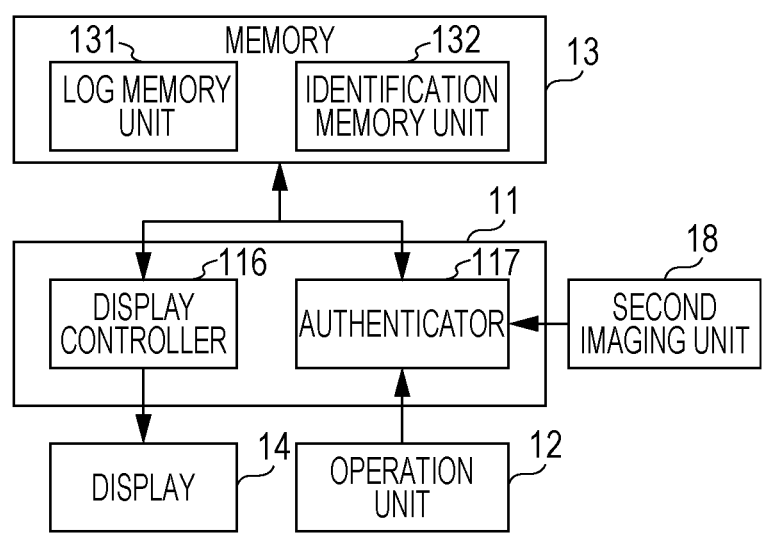
FIG. 13 is a functional block diagram illustrating the image forming apparatus.

FIG. 13 is a block diagram illustrating a log display function. An identification memory unit 132 stores the image of the face photograph and the authentication table TB1, and is an example of a memory that pre-stores information to identify a person authorized to use the image forming apparatus 10.

A log memory unit 131 stores the log data as a history of authentication of users, and is an example of a memory that stores a history of authentication of users of the image forming apparatus 10.

An authenticator 117 is an example of each of a first authentication unit and a second authentication unit that authenticate the user of the image forming apparatus 10. The authenticator 117 acquires the user ID and the password via the operation unit 12 as information identifying the user of the image forming apparatus 10. The authenticator 117 also captures an image of the face of the user photographed by the second imaging unit 18. The second imaging unit 18 is an example of a capturing unit that captures the face image of the user. The authenticator 117 authenticates the user of the image forming apparatus 10 using the acquired information and the information stored on the identification memory unit 132. To perform the authentication process using the face image, the authenticator 117 performs the face authentication by comparing a feature quantity of the face photographed by the second imaging unit 18 with the feature quantity of the face of the image file acquired from the identification memory unit 132.

A display controller 116 is an example of a display that displays the image of the face of the person who has used the image forming apparatus 10. Based on the log data stored on the log memory unit 131, the display controller 116 identifies the past user of the image forming apparatus 10, acquires the face image of the identified user from the identification memory unit 132, and then displays the acquired face image by controlling the display 14.

Figure 14:
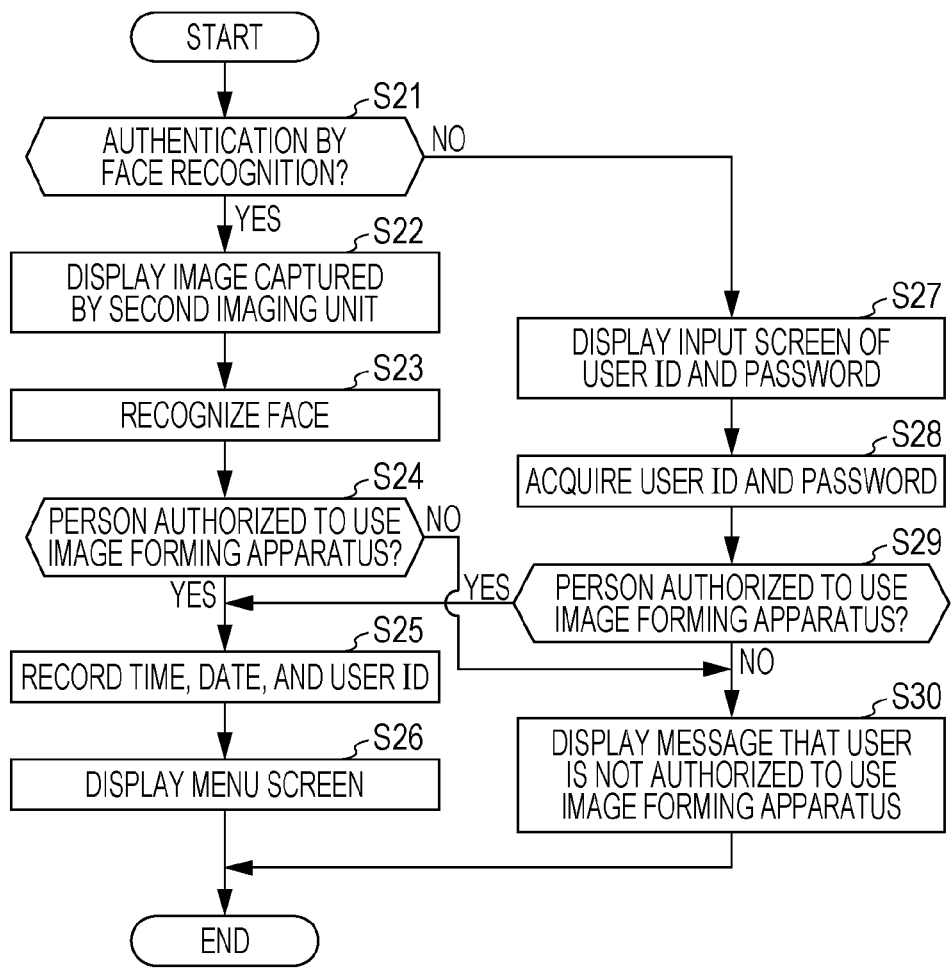
FIG. 14 is a flowchart illustrating a flow of an authentication process of the image forming apparatus.

FIG. 14 is a flowchart illustrating a flow of the authentication process. If the user remains logged out, the controller 11 controls the display 14 to display a screen (FIG. 16) that prompts the user to select between an authentication process by face image and an authentication process by the user ID and password. If the user selects the authentication process by face recognition on the screen of FIG. 16 (yes branch from step S21), the controller 11 controls the second imaging unit 18 and the display 14 so that the image captured by the second imaging unit 18 is displayed on the display 14 (step S22). FIG. 17 illustrates an example of the screen displayed on the display 14 in step S22. The user of the image forming apparatus 10 moves himself or herself so that his or her face appears in a frame while looking at the second imaging unit 18.

The controller 11 analyzes the image captured by the second imaging unit 18 and recognizes the face of the user (step S23). Upon recognizing the face, the controller 11 references the image file of the face photograph stored on the memory 13, compares the feature quantity of the recognized face with the feature quantity of the face photograph of the referenced image file and thus determines whether the user has been authorized to use the image forming apparatus 10 (step S24). If a difference between the feature quantity of the recognized face and the feature quantity of the face photograph of the referenced image file is lower than a threshold value, the controller 11 accepts the certification of the user, and authorizes the user to use the image forming apparatus 10 (yes branch from step S24).

The controller 11 stores the log data related to the user authorized to use the image forming apparatus 10 (step S25). More specifically, the controller 11 searches the authentication table TB1 according to a file name as a key of the image file of the face image having a difference from the feature quantity of the photographed face image smaller than the threshold value, and acquires the user ID from the record storing the file name as the key. For example, if the file name of the image file of the face photograph having a difference from the feature quantity of the photographed face image smaller than the threshold value is "aaabbb.jpg", the controller 11 acquires "aaabbb" as the user ID. The controller 11 then causes the memory 13 to store the acquired user ID and time and date of the reception of the certification of the user in association with each other as illustrated in a first-row record of FIG. 12. Upon completing the operation in step S25, the controller 11 controls the display 14 to display a menu screen to use the image forming apparatus 10.

If the certification of the user is rejected with no branch from step S24, the controller 11 controls the display 14 to display a message that notifies the user that the user is not authorized to use the image forming apparatus 10 (step S30).

Figure 16:
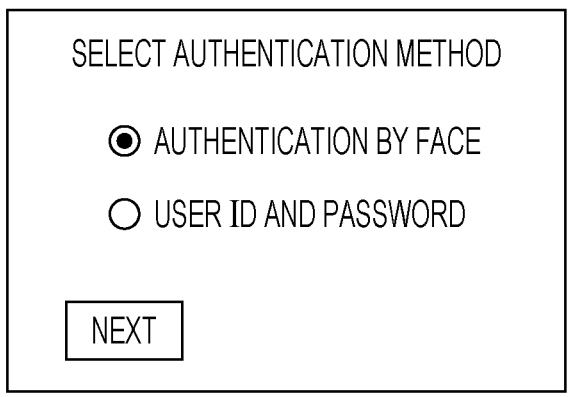
FIG. 16 illustrates an example of a screen displayed on a display.
Figure 17:
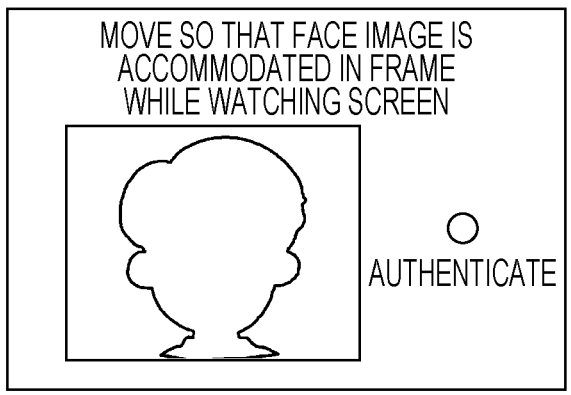
FIG. 17 illustrates an example of the screen displayed on the display.

If the user selects the authentication process by the user ID and password on the screen of FIG. 16 (no branch from step S21), the controller 11 controls the display 14 to display a screen (FIG. 18) that prompts the user to enter the user ID and password (step S27). When the user enters the user ID and password on the screen of FIG. 18 by operating the operation unit 12, the controller 11 acquires the input user ID and password (step S28). The controller 11 references the user ID and password stored on the memory 13 and then authenticates the user (step S29).

If the record storing a combination of the acquired user ID and password is included in the authentication table TB1, the controller 11 accepts the certification of the user, and then authorizes the user to use the image forming apparatus 10 (yes branch from step S29). The controller 11 proceeds via the yes branch from step S29 to step S25. For example, if a person having a user ID "ggghhh" enters the user ID "ggghhh" and password "ggg1357", the controller 11 causes the memory 13 to store the user ID "ggghhh" and time and date of the reception of the certification of the user in association with each other in a second-row record of FIG. 12. If the record storing a combination of the acquired user ID and password is not included in the authentication table TB1, the controller 11 discards the certification of the user (no branch from step S29), and controls the display 14 to display a message that notifies the user that he or she is not authorized to use the image forming apparatus 10 (step S30).

Figure 15:
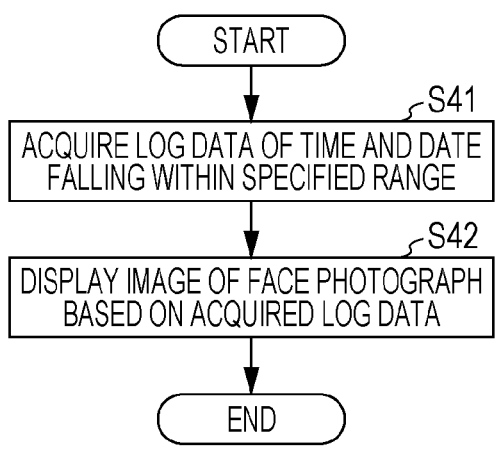
FIG. 15 is a flowchart illustrating a user display process of the image forming apparatus.

The user display process to display the image of the face photograph of the authenticated user is described. FIG. 15 is a flowchart illustrating the user display process. If an operation to instruct the face photograph of the authorized user to be displayed has been performed on the operation unit 12, the controller 11 acquires the log data of time and date within a predetermined range from a time band from the operation (step S41). In the present exemplary embodiment, the controller 11 identifies past six time bands including the time band of the operation, and acquires the log data of time and date included in the identified time bands.

If an instruction to display the log data was issued at 15:55, Oct. 31, 2013 after the log data was stored as illustrated in FIG. 12, the controller 11 acquires log data included in a time band from 12:00 to immediately before 16:00 inclusive of the time and date of the operation on October 31, log data included in a time band from 8:00 to immediately before 12:00 on October 31, log data included in a time band from 4:00 to immediately before 8:00 on October 31, log data included in a time band from 0:00 to immediately before 4:00 on October 31, log data included in a time band from 20:00 on October 30 to immediately before 0:00 on October 31, and log data included in a time band from 16:00 to immediately before 20:00 on October 30. If the contents of the log data are something illustrated in FIG. 12, the controller 11 acquires data of three records of FIG. 12.

The controller 11 displays the image of the face photograph in accordance with the log data acquired in step S41 (step S42). More specifically, the controller 11 extracts the user ID included in the acquired log data, and acquires the image file name associated with the extracted user ID from the authentication table TB1. The controller 11 retrieves from the memory 13 the image file identified by the acquired image file name, and display the image represented by the acquired image file.

Figures 18, 19:
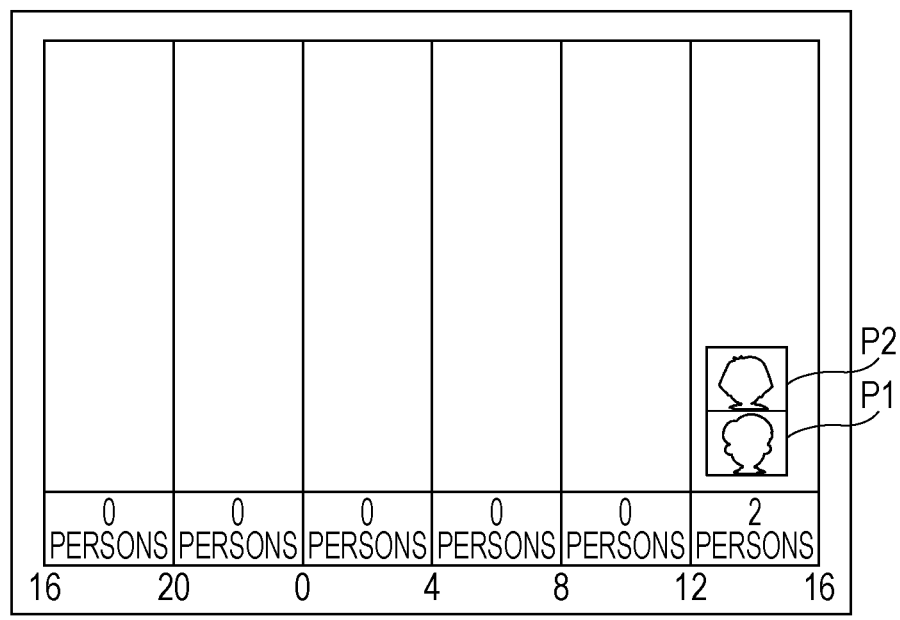
FIG. 18 illustrates an example of the screen displayed on the display.
FIG. 19 illustrates an example of the screen displayed on the display.

If the data of the three records of FIG. 12 is acquired, the controller 11 acquires an image file name "aaabbb.jpg" from the authentication table TB1 of FIG. 11 based on the user ID "aaabbb" included in the record having time and date "Oct. 31, 2013 13:10" of the log data. As illustrated in FIG. 19, the controller 11 displays an image P1 of the image file identified by the acquired file name in a region identifying the time band from 12:00 to immediately before 16:00 on October 31. For simplicity of the drawings, the feature of each face is not depicted in detail in FIG. 19.

The controller 11 acquires an image file name "cccddd.jpg" from the authentication table TB1 of FIG. 11 based on the user ID "cccddd" included in a record having time and date "Oct. 31, 2013 13:40" of the log data. As illustrated in FIG. 19, the controller 11 displays an image P2 of the image file identified by the acquired file name in a region identifying the time band from 12:00 to immediately before 16:00 on October 31.

Of the acquired log data, no image file name is associated with the stored user ID "ggghhh" in the authentication table TB1 in the record having time and date "Oct. 31, 2013 14:20", and no image file name is thus acquired. The image of the face photograph is thus not displayed. From among the users who are authenticated during the time band from 12:00 to immediately before 16:00, the number of persons whose image files of the face photographs is "two", and two persons are thus displayed in the time band from 12:00 to immediately before 16:00 as illustrated in FIG. 19. In the screen example of FIG. 19, the number of face photographs displayed in each region of time band is 24. The display region displaying the number of persons indicates the total number of users whose image files of the face photographs are stored from among the users authenticated in each time band.

As described above, the face photograph of the authorized person is displayed in the exemplary embodiment. In comparison with the case in which a name and a user identification are displayed, the administrator of the image forming apparatus 10 may easily learn who has used the image forming apparatus 10 in what time band.

The present invention may be implemented in an exemplary embodiment different from the exemplary embodiment described above. Modifications of the exemplary embodiment described below may be combined.

In the exemplary embodiment described above, the image forming apparatus 10 varies the presence sensing area R2 by detecting the connection of the peripheral device 20 arranged external to the image forming apparatus 10. Alternatively, the image forming apparatus 10 may vary the presence sensing area R2 by detecting the movement of a device included in the image forming apparatus 10 or connected to the image forming apparatus 10.

If the peripheral device 20 is moved, the dimensions of the entire image forming apparatus 10 become different, and an area where the working user moves around may also vary.

This type of peripheral device 20 includes a movable user interface device, a manual paper feeding tray, and a discharge tray into which processed sheets are discharged. The peripheral device 20 may also include a device that is movably mounted on the image forming apparatus 10. If the device is moved, the external shape and dimensions of the image forming apparatus 10 also change. Upon detecting the movement of the peripheral device 20, the image forming apparatus 10 sets up the presence sensing area R2 so that the presence sensing area R2 includes the front side of the image forming apparatus 10 subsequent to the movement of the device.

The dimensions and shapes of the approach sensing area R1 and the presence sensing area R2 are illustrated for exemplary purposes only, and different dimensions and shapes may be acceptable.

The image forming apparatus 10 may shift from the sleep mode to the standard mode by interpreting the presence of the person within the approach sensing area R1 as the approach of the person to the image forming apparatus 10.

The image forming apparatus 10 may sense the approach of the person within the approach sensing area R1 by allowing the first imaging unit 17 to continuously operate. In such a case, the image forming apparatus 10 may not include the pyroelectric sensor 16.

The image forming apparatus 10 may include separate image devices, one for sensing the approach of the person in the approach sensing area R1 and the other for sensing the presence of the person within the presence sensing area R2.

The image forming apparatus 10 may sense the approach of a person within the approach sensing area R1 through a method other than the method that includes using the first imaging unit 17. For example, using multiple distance sensors, the image forming apparatus 10 identifies the location of a person within the approach sensing area R1 and senses the approach of the person in accordance with a change in the identified location with time. The image forming apparatus 10 may sense the presence of a person within the presence sensing area R2 through a method other than the method that includes using the captured image.

The image forming apparatus 10 may immediately shift to the sleep mode upon sensing the no-presence of the person within the presence sensing area R2.

The image forming apparatus 10 may vary the presence sensing area R2 depending on only whether the peripheral device 20 is connected or not. Alternatively, the image forming apparatus 10 may set the presence sensing area R2 to be fixed regardless of whether the peripheral device 20 is connected or not.

The image forming apparatus 10 may vary not only the presence sensing area R2 but also the approach sensing area R1. In such a case, the image forming apparatus 10 may set the approach sensing area R1 in concert with a change in the presence sensing area R2 so that the approach sensing area R1 includes the entire presence sensing area R2.

The movement of the person may be sensed through a method that does not include calculating the motion vector. The movement of the person may be sensed through any related art method such as a block matching method.

Rather than recognizing a person from a captured image and sensing the movement of the person, the image forming apparatus 10 may sense the movement of the person using a related art technique of extracting a moving object without particularly recognizing the person.

In the exemplary embodiment, the image forming apparatus 10 shifts to the sleep mode when the person is no longer present within the presence sensing area R2. The mode to which the image forming apparatus 10 shifts may be a mode other than the sleep mode as long as the target mode consumes power less than the standard mode. For example, the image forming apparatus 10 may shift to a mode in which the display operation of the display 14 is stopped to reduce power consumption while the units of the image forming apparatus 10 other than the display 14 are kept operative. The image forming apparatus 10 may operate in another mode different in power consumption from the standard mode and the sleep mode.

In the exemplary embodiment, the total number of face photographs to be displayed in the region of each time band is 24 in the screen of FIG. 19. The total number is not limited to 24. For example, the total number may be 23 or less or 25 or more. In the display example of FIG. 19, the display region of each time band is 4 hours. But the time band may not necessarily have to be 4 hours. The time band may be different from 4 hours, and for example, may be another time unit, such as 3 hours or 6 hours. In the screen of FIG. 19 displayed in the exemplary embodiment, the region of the time band on the day and the region of the time band on the previous day may be differently colored on the display.

If the number of pieces of log data containing image files of face photographs exceeds 24 in each time band of FIG. 19 in the present exemplary embodiment, images of face photographs of 24 pieces of log data authenticated on youngest time and date may be displayed. The display 14 may be a touchpanel, and if a user flicks a display area of the face photograph, an image of a face photograph other than the displayed 24 images may be displayed.

As time passes with the image of FIG. 19 displayed in the present exemplary embodiment, the images of the face photographs may be re-displayed with the display time bands modified. For example, it is assumed that time became 16:00 with the image of FIG. 19 displayed after an instruction to display the log data was issued at 15:55, Oct. 31, 2013. In such a case, the images of the face photographs are displayed using log data included in a time band from 16:00 to immediately before 20:00 on October 31, log data included in a time band from 12:00 to immediately before 16:00 on October 31, log data included in a time band from 8:00 to immediately before 12:00 on October 31, log data included in a time band from 4:00 to immediately before 8:00 on October 31, log data included in a time band from 0:00 to immediately before 4:00 on October 31, and log data included in a time band from 20:00 on October 30 to immediately before 00:00 on October 31.

Figure 20A:
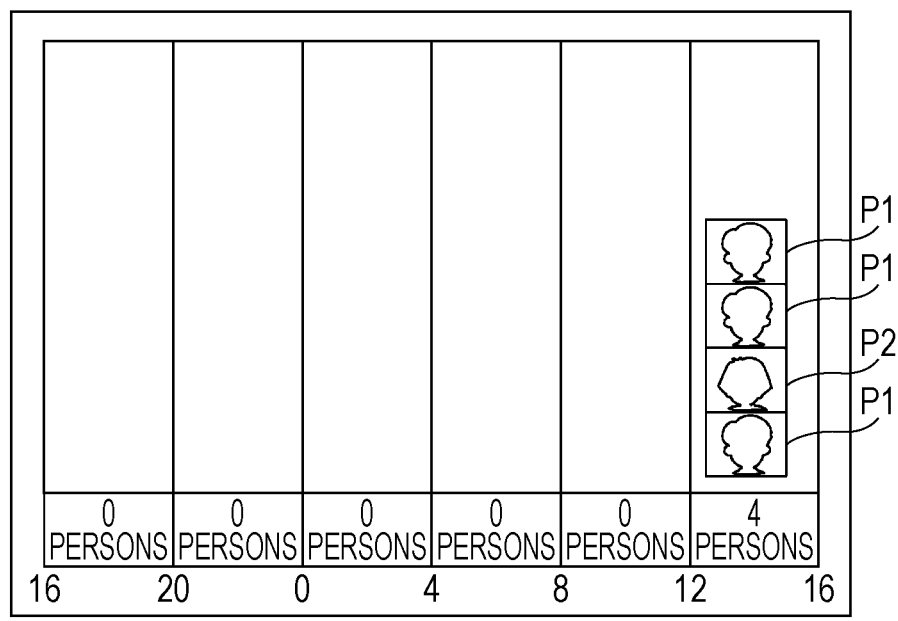
FIGS. 20A and 20B illustrate examples of the screen displayed on the display.

In the exemplary embodiment, multiple images of the face photographs of the same user are displayed if multiple pieces of log data of the same user are used. For example, if a user having a user ID "aaabbb" is authenticated by three times in the time band from 12:00 to immediately before 16:00, three images P1 of the face photograph of the user are displayed as illustrated in FIG. 20A.

However, the displaying of the face photograph of the same user is not limited to this manner. For example, even if the user having the user ID "aaabbb" is authenticated by three times in the time band from 12:00 to immediately before 16:00, the number of images P1 of the face photograph of the user is set to be one as in FIG. 20B. The number of authentications of the user having the user ID "aaabbb" in this time band may be overlaid on the image P1.

Figure 20B:
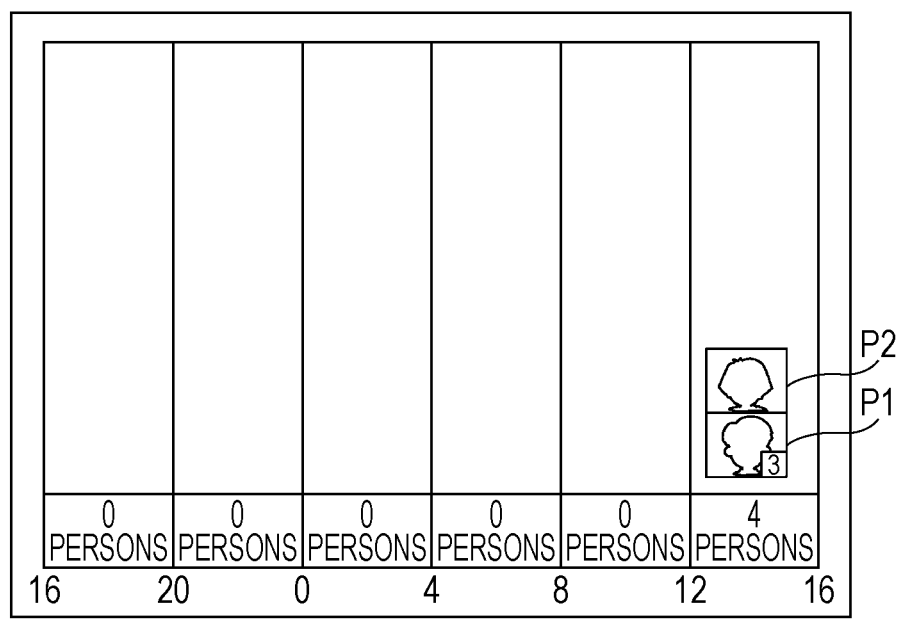

The display 14 may be a touchpanel, and if the image P1 is touched on with the screen of FIG. 20B displayed, times and dates of the three authentications of the user of the image P1 may be displayed.

Figure 21:
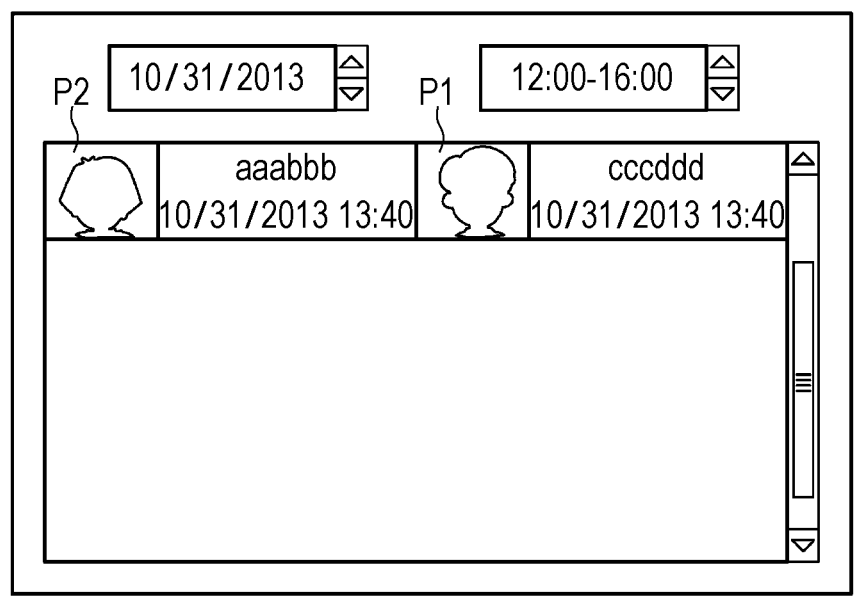
FIG. 21 illustrates an example of the screen displayed on the display.

If any time band is touched with the screen of FIG. 19 displayed on the touchpanel of the display 14, not only the face photograph of the touched time band but also the authentication time and date and the user ID may be displayed. For example, if the time band from 12:00 to immediately before 16:00 of FIG. 19 is touched, the authentication time and date and the user ID are displayed together with the face photograph as illustrated in FIG. 21. If a total of four persons are authenticated during the time band from 12:00 to immediately before 16:00 as illustrated in FIG. 20, the time and date of each of the four persons, and each user ID are displayed together with the face photographs.

The manner of displaying the screen of FIG. 21 is not limited to the manner described above. For example, the controller 11 causes the display 14 to display the screen to select time and date and time band. Using the log data related to the selected time and date and time band, the controller 11 displays the time and date of the authentication of the user, the user ID of the authenticated user, and the image of the face photograph of the authenticated user.

If the number of pieces of log data in the selected time band is above the number of pieces of log data that is permitted to be displayed on the screen of FIG. 21 at a time, the controller 11 may display the log data in the order from younger to older authentication time and date. If a scroll operation is performed on the touchpanel, older log data may then be displayed.

If multiple pieces of log data of the same user are available in the selected time band on the screen of FIG. 21, the number of images of face photographs of the user may be set to be one as in FIG. 20, and the number of authentications performed during the selected time band may be overlaid on the image of the face photograph.

In the present exemplary embodiment, the image of the face photograph is not displayed in the user display process if the image file of the face photograph of a user, from among the authenticated users, is not stored. But the present invention is not limited to this manner. If the controller 11 is unable to acquire the image file name of the face photograph based on the acquired log data in step S42, the controller 11 may display an image, such as a pictorial symbol corresponding to the face image and representing the face of a person (icon).

In the present exemplary embodiment, a user interface to enter time and date may be displayed, and a face photograph of a user authenticated on the time and date may be displayed in accordance with the log data of the entered time and date.

In accordance with the present exemplary embodiment, the second imaging unit 18 is installed adjacent to the display 14. The second imaging unit 18 may be installed at any location where the face of the user may be photographed.

In the above-described exemplary embodiment, the image forming apparatus 10 authenticates the user. The apparatus that authenticates the user is not limited to the image forming apparatus 10. For example, an imaging unit may be mounted on a terminal apparatus, such as a personal computer, which is shared by office workers at an office, and the terminal apparatus may perform the authentication process and the user display process.

In accordance with the present exemplary embodiment, the image file of the face photograph to authenticate the user is stored on the memory 13. The present invention is not limited to this manner.

For example, the image forming apparatus 10 may be connected via a communication network, such as a local area network (LAN), to a server apparatus that stores the authentication table TB1 and the image file of the face photograph. The image captured by the second imaging unit 18 is then transmitted to the server apparatus. The server apparatus performs the authentication process. Upon authenticating the user, the server apparatus controls the image forming apparatus 10 so that the user may use the image forming apparatus 10. The log data may be stored on the image forming apparatus 10 or the server apparatus. In this configuration, the server apparatus may perform the user display process.

In the exemplary embodiment, a record related to the user authenticated in the past may be deleted from the authentication table TB1 after the log data is created. If image file of the face photograph of that user is deleted from the memory 13, the image of the pictorial symbol representing the face of the person may be displayed instead of the image of the face photograph when the user display process is performed using the log data of that user.

If the authentication process by face recognition is performed in the present exemplary embodiment, data indicating that the authentication process by face recognition has been performed may be associated with a record in the log data. In this configuration, the record associated with the data that indicates that the authentication process by face recognition has been performed is extracted from the log data. The user display process may be performed using the extracted log data. When the screen of FIG. 19 is displayed in this configuration, only the image of the face photograph of the user authenticated in the face authentication is thus displayed.

In the present exemplary embodiment, the users of the image forming apparatus 10 may be divided groups according to section in an office, and data indicating each group may be added to the record of each user in the authentication table TB1. In this configuration, the log data is filtered by a group specified by the administrator during the user display process, and the images of the face photographs of the users are displayed in accordance with the filtered log data.

In the present exemplary embodiment, log data obtained when a scan process, a copy process, and/or a facsimile transmission process may be performed. The log data includes time and date of the execution of each process, the user ID of a user who has executed each process, and a process name of the executed process. The controller 11 acquires the log data of each executed process, and displays, in accordance with the log data, the process name of the executed process, the user who has executed the process, and the image of the face photograph of the user. As for the image of the face photograph, the controller 11 may acquire the image file of the face photograph using the user ID and the authentication table TB1 in the same manner as described with the exemplary embodiment. In the configuration, the controller 11 filters the log data by the process name of each process, and displays the process name of the executed process, the user who has executed the process, and the image of the face photograph of the user based on the filtered log data.

In the present exemplary embodiment, the controller 11 may not authorize to use the image forming apparatus 10 the user whose image has been captured with the second imaging unit 18 in the authentication process by face recognition. In that case, the image of the face captured by the second imaging unit 18 may be stored together with the time and date of the image capturing on the memory 13. In this configuration, the image of the face of the user who has not been authorized to use the image forming apparatus 10 may be displayed on the display 14 in response to an operation of the user.

In the present exemplary embodiment, the controller 11 may authorize to use the image forming apparatus 10 the user whose image has been captured with the second imaging unit 18 in the authentication process by face recognition. The image of the face captured by the second imaging unit 18 may be stored together on the memory 13 in association with the file name of the image in the log data. When the face image of the user of the image forming apparatus 10 is displayed, the image of the image file captured by the second imaging unit 18 and then stored on the memory 13 may be displayed.

In the present exemplary embodiment, the authentication process is performed in response to the operation of the user for authentication. The present invention is not limited to this configuration. For example, upon detecting the approaching of a person, the image forming apparatus 10 may automatically perform the authentication process by causing the second imaging unit 18 to capture the image of the person. Regardless of the authentication process, the image forming apparatus 10 may display the image of the face of the person. Upon detecting the approach of a person, the image forming apparatus 10 automatically causes the second imaging unit 18 to capture the image of the face of the person, causes the memory 13 to store the image file of the image of the face and the time and date of the image capturing, and then displays the contents of the stored image file and the time and date of the image capturing in response to an instruction of the user.

In the exemplary embodiment, the image forming apparatus 10 is of a console type. The image forming apparatus 10 may be of a desk-top type. The image forming apparatus 10 may be an apparatus that executes information processing in response to an operation of a user.

The information processing apparatus of the exemplary embodiment may be other than an image forming apparatus having multi-functions. For example, the information processing apparatus may be a scanning device, a copying device, or a facsimile device. The information processing apparatus may be a personal computer or a server apparatus.

Each function of the controller 11 in the image forming apparatus 10 may be implemented by one or more hardware circuits, may be implemented by a processing device that executes one or more programs, or may be implemented by a combination thereof.

If the function of the controller 11 is implemented using a program, the program may be supplied in a state recorded on a non-transitory computer readable recording medium. The non-transitory recording media include magnetic recording media (a magnetic tape, a magnetic disk (such as hard disk drive (HDD) or a flexible disk (FD)), an optical recording medium (such as an optical disk), a magneto-optical recording medium, and a semiconductor memory. The program may be distributed via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a capturing unit that is configured to capture a face image of a user;
    an authentication unit configured to authenticate the user upon detecting the user;
    a memory that stores a log of authentication of the user by the authentication unit; and
    a display that displays information based on the log together with a face image of the user captured by the capturing unit,
    wherein the display segments the log into a plurality of time bands, and then displays the face image of an authenticated user on a per segmented time band basis.

2. The information processing apparatus according to claim 1,
    wherein the authentication unit authenticates the user in accordance with the face image of the user,
    wherein the information processing apparatus further comprises another authentication unit that authenticates the user in accordance with information input by the user, and
    wherein the display displays information based on the log of the information processing apparatus together with the face image of only a user authenticated in accordance with the face image out of the users authenticated in the past.

3. The information processing apparatus according to claim 1,
    wherein the authentication unit authenticates the user in accordance with the face image of the user,
    wherein the information processing apparatus further comprises another authentication unit that authenticates the user in accordance with information input by the user, and
    wherein the display does not display information based on the log of the information processing apparatus together with the face image of a user authenticated by information input by the user, out of the users authenticated in the past.

4. The information processing apparatus according to claim 1, wherein in the displaying of each time band, a number of face images displayed on a display region of each time band is a predetermined value.

5. The information processing apparatus according to claim 1, wherein if one of the time bands is specified, the display displays the face images of the users authenticated in the specified time band in the order of authentication time.

6. The information processing apparatus according to claim 1, wherein the memory stores the face image of the user and wherein if the memory does not store any face image of a past user of the information processing apparatus, the display displays the log together with an image corresponding to the face image.

7. The information processing apparatus according to claim 1, wherein if same user has used the information processing apparatus by a plurality of times, the display sets a number of displays of the face image of the same user to one.

8. The information processing apparatus according to claim 7, wherein if the same user has used the information processing apparatus by the plurality of times, the display sets the number of displays of the face image of the same user to one, and a position of the face image to be displayed is determined based on latest authentication time.

9. The information processing apparatus according to claim 1,
wherein when a user touches a time band, the display displays the information based on the log together with the face image.

10. The information processing apparatus according to claim 9, wherein the information based on the log that is displayed when the user touches the time band comprises an authentication date and time, and user identification information.

11. An information processing method comprising:
capturing a face image of a user;
authenticating the user upon detecting the user;
storing a log of authentication of the user; and
displaying information based on the stored log together with the captured face image of the user,
wherein the displaying information comprises segmenting the log into a plurality of time bands, and displaying the face image of an authenticated user on a per segmented time band basis.

12. A non-transitory computer readable medium storing a program causing a computer to execute a process for processing information, the process comprising:
capturing a face image of a user;
authenticating the user upon detecting the user;
storing a log of authentication the user; and
displaying information based on the stored log together with the captured face image of the user,
wherein the displaying information comprises segmenting the log into a plurality of time bands, and displaying the face image of an authenticated user on a per segmented time band basis.

* * * * *